US006121571A

United States Patent [19]

Siniaguine et al.

[11] Patent Number: 6,121,571

[45] Date of Patent: Sep. 19, 2000

[54] PLASMA GENERATOR IGNITION CIRCUIT

[76] Inventors: Oleg Siniaguine, 1247 Weibel Way, San Jose, Calif. 95125; Patrick Halahan, 657 N. Pastoria Ave., Sunnyvale, Calif. 94086

[21] Appl. No.: 09/465,989

[22] Filed: Dec. 16, 1999

[51] Int. Cl.[7] .......... B23K 9/00

[52] U.S. Cl. .......... 219/121.54; 219/121.57; 219/121.5; 219/75; 219/121.48

[58] Field of Search .......... 219/121.48, 121.5, 219/121.54, 121.57, 74, 75; 313/231.31, 231.41

[56] References Cited

U.S. PATENT DOCUMENTS

| | | | |
|---|---|---|---|
| 3,594,609 | 7/1971 | Vas et al. | 315/111 |
| 3,639,831 | 2/1972 | Cushman | 324/33 |
| 3,743,781 | 7/1973 | Holden | 219/38 |
| 3,798,408 | 3/1974 | Foex et al. | 219/121 |
| 3,818,174 | 6/1974 | Camacho | 219/121 |
| 3,828,162 | 8/1974 | Holden | 219/383 |
| 3,980,467 | 9/1976 | Camacho et al. | 75/10 R |
| 4,382,099 | 5/1983 | Legge et al. | 427/34 |
| 4,420,346 | 12/1983 | Belkin et al. | 148/4 |
| 4,517,495 | 5/1985 | Piepmeier | 315/111.21 |
| 4,959,520 | 9/1990 | Okada et al. | 219/121.48 |
| 5,041,713 | 8/1991 | Weidman | 129/121.51 |
| 5,506,384 | 4/1996 | Yamaguchi | 219/121.57 |
| 5,560,779 | 10/1996 | Knowles et al. | 118/723 |
| 5,562,841 | 10/1996 | Kulik et al. | 219/121.59 |
| 5,609,777 | 3/1997 | Apunevich et al. | 219/121.48 |
| 5,719,370 | 2/1998 | Appunevich et al. | 219/121.49 |
| 5,782,952 | 7/1998 | Diaz et al. | 75/10.19 |
| 5,895,558 | 4/1999 | Spence | 204/164 |

*Primary Examiner*—Mark Paschall
*Attorney, Agent, or Firm*—Skjerven Morrill MacPherson Franklin & Friel, LLP; George Wolken, Jr.

[57] ABSTRACT

The present invention relates to ignition circuitry for a plasma generator. A discharge is created by application of a high frequency or high voltage dc ignition pulse between an electrode and a first nozzle. Following ignition, the discharge is redirected to a second nozzle for the purpose of moving the plasma flow from the ignition zone into the zone of application to the workpiece. The present invention is directed to plasma ignition circuitry for improving this performance. Positive thermal coefficient ("PTC") resistance is shown to be useful in reliably and reproducibly switching the arc. Alternative embodiments of the present invention relate to switching the plasma from a first nozzle to a second nozzle then sequentially to additional nozzles downstream in the flow of plasma gas in which PTC resistance is used to reliably and reproducibly effect the switching. Yet other embodiments of the present invention relate to the generation of two plasma jets directed so as to intersect, and switching current flow from the plasma-igniting nozzle electrodes to a direct flow of current from one electrode through the two plasma jets to the second electrode.

12 Claims, 6 Drawing Sheets

PLASMA GENERATOR IGNITION CIRCUIT

BACKGROUND OF THE INVENTION

1. Technical Field

The present invention relates to the generation of plasmas and, more particularly, to a circuit for igniting a dc discharge between a first electrode and a second electrode followed by switching the discharge from the second electrode to one, or sequentially, to more than one additional electrodes whereby improved reliability and stability in the switching of the discharge is obtained.

2. Description of Related Art

Plasmas have many industrial applications such that the efficient generation of plasmas is a subject of considerable interest. One recent example relates to the thinning of integrated circuit wafers by plasma etching. Consumers of electronic products are demanding small, lightweight and high performance devices (cell phones, laptops, palmtops and smartcards are a few examples). The integrated circuits and their packages providing the functionality of such devices must occupy smaller spaces but deliver higher performance than their predecessors. These market forces are leading to the development of high-speed ultra-thin integrated circuit chips occupying less space and having multiple layers of dense interconnects. Thus, a need has emerged and is rapidly growing for wafer thinning equipment, and plasma thinning is a leading candidate for meeting these needs of the chip makers. One example of plasma generating equipment to meet these needs is the work of Siniaguine, (U.S. Pat. No. 5,767,627) in which plasmas at atmospheric pressure are generated and used, avoiding the difficulties of performing the plasma etching in a vacuum.

The common plasma discharge used for wafer thinning is dc. However, to ignite the discharge, high frequency and/or high voltage is typically used. That is, a pulse of high voltage dc may be applied to ignite the discharge, followed by application of much lower dc voltage to maintain a stable discharge. Alternatively, high frequency (typically rf) may be applied for the purpose of igniting the plasma then switching to dc for operation. Although dc discharges are the primary focus of the present invention, both dc and rf may be used for ignition.

The generation (ignition) of a discharge in neutral gas typically requires conditions of high voltage and/or high frequency in comparison with the conditions necessary for maintaining a stable discharge once ignited. Thus, high voltage/ high frequency are typically transiently applied to the gas during plasma ignition. The work of Beasley (U.S. Pat. No. 5,914,571) describes the reduction in ignition voltage occurring with increasing frequency (FIG. 1 therein) and circuitry for application of higher frequencies only until the discharge ignites. Unlike the present invention, this work of Beasley relates to the generation of high frequency discharges for purposes of illumination. DC discharges are described by Kim et. al. (U.S. Pat. No. 5,909,086), Sellers (U.S. Pat. No. 5,717,293), Dorfman et. al. (U.S. Pat. No. 5,296,670).

The present invention relates to a plasma generator of the general type described in the work of Siniaguine noted above. In such generator, a discharge is created by application of high ignition voltage and/or high frequency between an electrode and a first nozzle. The nozzles are electrically conducting and serve the dual function of guiding the plasma gas as a nozzle and acting as electrodes for plasma ignition and generation. Following ignition, the discharge is redirected from the first nozzle to a second nozzle for the purpose of moving the plasma flow from the ignition zone into the zone of application to the workpiece, and for avoiding deleterious plating of material from the electrode to the first nozzle that is typically located in close proximity to the electrode (approximately 1.5 mm in some equipment). In practice, switching of the plasma from the first nozzle to a second nozzle has proven to be a difficult process to control reliably and reproducibly. The present invention is directed to plasma ignition circuitry for improving this performance. Alternative embodiments of the present invention relate to switching the plasma from a first nozzle to a second nozzle then sequentially to additional nozzles downstream in the flow of plasma gas. Yet other embodiments of the present invention relate to the generation of two plasma jets directed so as to intersect, and switching current flow from the plasma-igniting nozzle electrodes to a direct flow of current from one electrode through the two plasma jets to the second electrode.

SUMMARY OF THE INVENTION

The present invention relates to ignition circuitry for a plasma generator. A discharge is created by application of appropriate ignition voltage/frequency between an electrode and a first nozzle having the plasma gas flowing between the electrode and nozzle. The ignition voltage may be either high frequency (typically rf), or alternatively, ignition is caused by application of a high voltage dc pulse. Following ignition, the discharge is redirected from the first nozzle to a second nozzle for the purpose of moving the plasma flow from the ignition zone into the zone of application to the workpiece. This switching of discharge from a first nozzle to a second nozzle is commonly known as "pulling out the arc." In practice, switching of the plasma from the first nozzle to a second nozzle has proven to be a difficult process to control reliably and reproducibly. The present invention is directed to plasma ignition circuitry for improving this performance. Positive thermal coefficient ("PTC") resistance is shown to be useful in reliably pulling out the arc. Alternative embodiments of the present invention relate to switching the plasma from a first nozzle to a second nozzle then sequentially to additional nozzles downstream in the flow of plasma gas in which PTC resistance is used to reliably and reproducibly effect the switching. Yet other embodiments of the present invention relate to the generation of two plasma jets directed so as to intersect, and switching current flow from the plasma-igniting nozzle electrodes to a direct flow of current from one electrode through the two plasma jets to a second electrode.

An important advantage of the present invention includes more reliable and reproducible control of pulling out the plasma arc. Another advantage of the present invention is the reduction or elimination of metal transfer from the electrode to the proximate nozzle, leading to more reliable plasma start-up and longer electrode life.

BRIEF DESCRIPTION OF THE DRAWINGS

The drawings are not to scale.

DETAILED DESCRIPTION OF THE INVENTION

In the following description and figures, similar reference numbers are used to identify similar elements.

Figure 1:
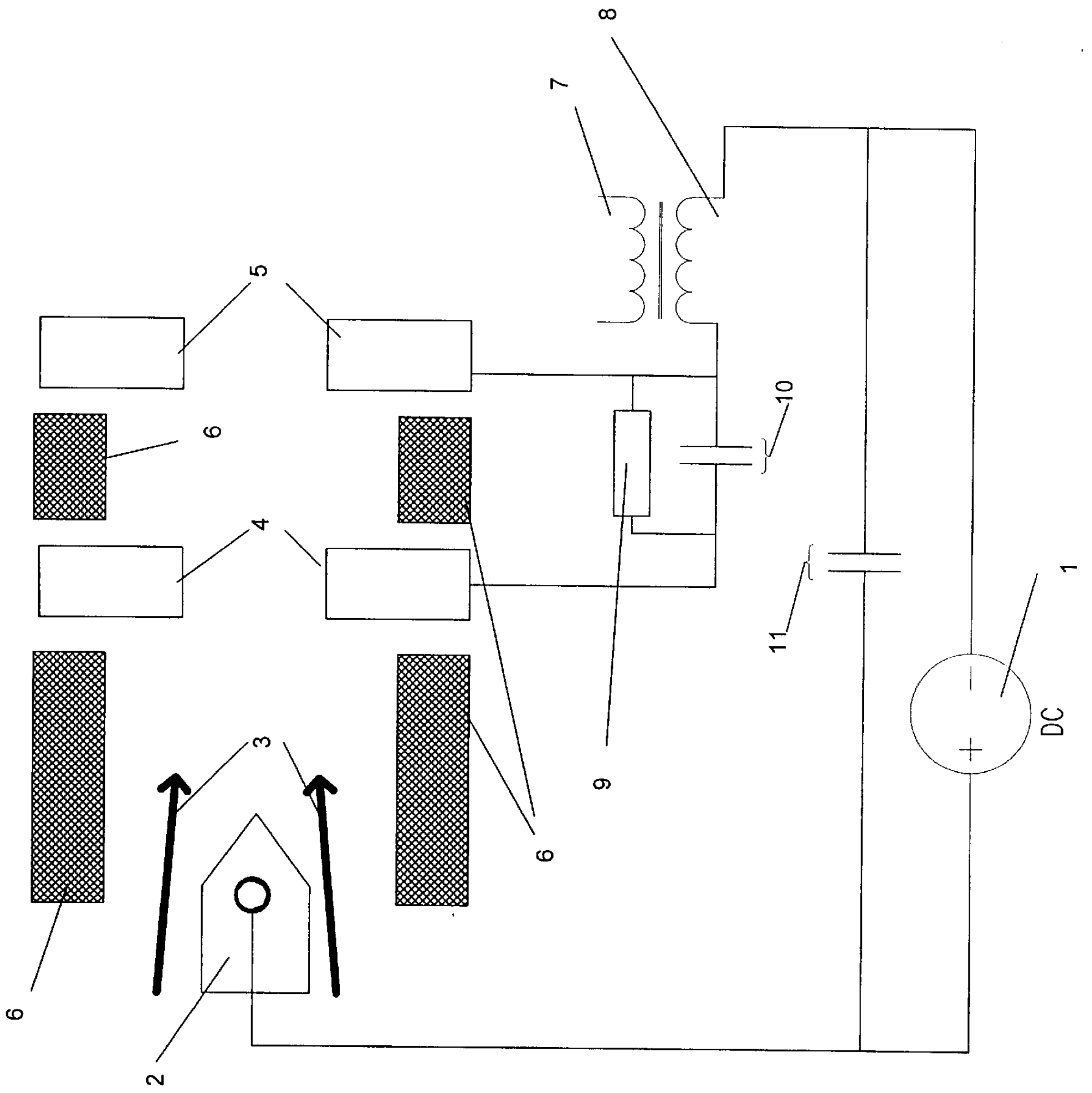
FIG. 1: Schematic depiction of single jet, two nozzle plasma generator.

FIG. 1 depicts a schematic circuit diagram of the ignition circuitry of an embodiment of the present invention. A dc power supply, 1, is connected to electrode 2 and to nozzles 4 and 5. The gas through which a discharge is to be generated, 3, flows typically around electrode 2 then through nozzles 4 and 5. Electrode, 2, as well as nozzles 4 and 5 are depicted in cross section in FIG. 1. For the typical operation of the present invention, electrode, 2, may be made of tungsten or tungsten-thorium oxide alloy. The nozzles 4 and 5 and electrode 2 are separated by insulators, 6, also depicted in cross section in FIG. 1. Typically in the practice of the present invention, the spacing from electrode, 2, to nozzle, 4 may be approximately 1.5 mm (millimeters). In a typical plasma generator used in accordance with the present invention (see, for example the work of Siniaguine, U.S. Pat. No. 5,767,627), electrode 2 would have a cylindrical, conical or generally elongate shape with gas, 3, flowing around the outside thereof in the general direction parallel to the elongate axis.

In operation, gas, 3, flows past electrode 2 then through nozzles 4 and 5. In one embodiment, a high frequency ("HF") pulse is applied to input winding 7, of a transformer. This HF pulse at 7 generates an output pulse at winding 8. The HF pulse and the transformer properties are chosen so as to initiate electrical breakdown in the gas, 3. Breakdown occurs by using the proper voltage, frequency and transformer properties so as to lead to the desired gas breakdown between electrode 2 and nozzle 4. For the typical operation of the present invention, the high frequency applied to ignite the plasma discharge will be approximately 10 MHz (megahertz) with a peak voltage of approximately 6,000 volts (6 KV).

The HF output pulse from 8 passes through capacitor 10, nozzle 4, the plasma discharge initiated and now existing in gas 3, thence to electrode 2 and return to the output winding, 8. As discussed in detail below, component 9 typically includes a positive thermal coefficient ("PTC") resistor. PTC resistors typically have significant impedance to HF, making a shunt capacitor, 10, advisable for igniting the discharge in gas, 3. Capacitor 11 is optionally included as a shunt, providing a path for the HF ignition voltage to bypass the dc power supply, 1. Capacitor 11 is desirable as a shunt in those cases in which HF passing through the dc power supply causes a danger to semiconductor or other components in the power supply. If HF damage to the dc power supply is not a concern, shunt 11 may be omitted. Typically, capacitor 10 (and 11 when present) will be approximately 0.1 microfarad, 10 KV capacitors.

The use of high frequency to ignite the plasma has some disadvantages. Among these are the interference that may occur in control systems and other electronics in the vicinity of the plasma generator. As an alternative, the plasma in gas, 3, may be ignited by application of a dc pulse having sufficiently high voltage to initiate discharge. A dc pulse of approximately 4 KV applied for a duration of approximately 10 ms (milliseconds) is typically sufficient for ignition of discharge in plasma gases of interest for the present invention. Commercial manufacturers of dc power supplies (for example, Advanced Energy Industries, Inc. of Fort Collins, Colo.) typically offer power supplies having the feature of generating high voltage dc pulses when desired by the user. Apart from the transient ignition pulse, power supply 1 will typically supply 120 V nominal voltage and 300 V open loop voltage.

The use of a high voltage pulse of dc for plasma ignition has disadvantages as well. Among these are the necessity for the application of typically higher voltages than required when high frequency plasma ignition is used. Typically, a more expensive dc power supply is needed for dc plasma ignition. Also, dc plasma ignition typically is more sensitive than high frequency ignition to the condition of the electrode surfaces. That is, oxide layers as commonly found on the electrode surfaces may significantly affect the conditions (typically the voltage) necessary to achieve plasma ignition. Thus, although trade-offs between high frequency / high voltage plasma ignition are necessary, the present invention may be employed whichever ignition mode is selected.

If dc ignition is chosen for operation of a particular plasma generator, then capacitors 10 and 11 are superfluous and may be omitted. Transformer 7,8 is also superfluous when dc ignition is used and may be omitted in such cases. DC generator, 1, is typically used both for application of the plasma-igniting dc pulse and for the application of the plasma-maintaining dc.

Typically, gas, 3, will be an inert gas such as Ar, He, Xe, Ne, $N_2$ or mixtures thereof, in order to reduce material loss from electrode, 2, and nozzles 4 and 5. Reactive gases such as air, oxygen, chlorine-containing materials, fluorine-containing materials may also be employed. However, if such reactive gases are employed as (or in) gas 3, substantial loss of material from the electrode and/or nozzles may result. It is often the case that gas, 3, is selected to be inert and reactive gases for creation of the reactive plasma are injected into the plasma downstream from nozzle, 5, in order to avoid significant material loss from direct contact of the reactive gas(es) with the electrode and nozzle components. However, the present invention is not inherently limited to a particular choice of gas or gases, and may readily be modified for use with other gas(es).

After the breakdown of the gas between electrode 2 and nozzle 4 by the HF pulse, the HF pulse terminates and the discharge is maintained by the dc power supply, 1, with direct current flowing between electrode 2 and nozzle 4 via the flowing plasma, 3. A resistor, 9, is interposed in the circuit to limit the current flow through the typically low resistance plasma, shunted by capacitor 10 to provide the plasma-igniting HF an unimpeded path to the gas discharge region.

The separation between electrode, 2, and nozzle 4 is typically rather small to facilitate the initiation of the plasma discharge. A separation of 1.5 mm is typical. However, such a small separation may result in the removal of material from electrode, 2, and its deposit onto nozzle, 4. Sufficient plating of material from electrode, 2, to nozzle, 4, will result in a short circuit between the electrode and nozzle, and failure of the device to strike an arc. Thus, switching of the arc from nozzle 4 to nozzle 5 is one way to reduce or eliminate material plating from the electrode. Pulling of the arc from nozzle 4 to nozzle 5 reliably and reproducibly is one objective of the present invention.

The gas, 3, is heated by the dc current, partially ionized and blown into the channel formed by nozzles 4 and 5. Thus, current will be carried by the plasma, 3, to both nozzles 4 and 5. Due to the presence of resistor, 9, however, there will be a larger potential difference between nozzle 4 and electrode 2 than between nozzle 5 and electrode 2. That is, the voltage drop along the path having components labeled 1-2-4-9-1 is larger than the voltage drop along the path having components labeled 1-2-5-1. The resistance of the plasma between nozzles 4 and 5 is not sufficiently large to have a substantial effect on the overall path resistance for typical plasma operating conditions and values of resistance, 9. Thus, the current-carrying plasma arc will tend to depart from its initial path on nozzle 4 to take the path of lower resistance through nozzle 5. This shift of the plasma arc from nozzle 4 to nozzle 5 is referred to as "pulling out the arc."

The above configuration resulting in "pulling out the arc" is desirable for a number of reasons. It is advantageous to have the space between electrode 2 and nozzle 4 very small in order to facilitate breakthrough and initiation of the arc. However, this close proximity leads to evaporation of small amounts of metal. After several hundred start-up cycles of the plasma generator, sufficient metal can be transferred to cause a short circuit between the proximate electrode 2 and nozzle 4. Without the present invention, short circuit problems were seen to occur after approximately 100 to 120 start-up cycles. Employing the present invention has lead to improved performance of 250 start-up cycles without the occurrence of failure or ignition problems.

The time that current flows through nozzle 4 (that is, the time prior to pulling out the arc), can be subject to substantial variations. For example, the stability of gas consumption, the condition of nozzle 4, the condition of electrode 2, the precise dimensions and spacing determined by manufacturing tolerances can all affect the length of time during which current flows through nozzle 4. The result may be premature loss of material (destruction) of nozzle 4 and/or longer time delay until the arc switches to nozzle 5. It is also observed that if current flows through nozzle 4 for too long a time before switching to nozzle 5, the arc tends to drift from its desirable location on the tip of electrode 2 to other positions on the electrode. Damage to electrode 2, or evaporation of electrode material, is often the result. Thus, control of the arc and control of the time of switching from nozzle 4 to nozzle 5 is an object of the present invention.

Figure 2:
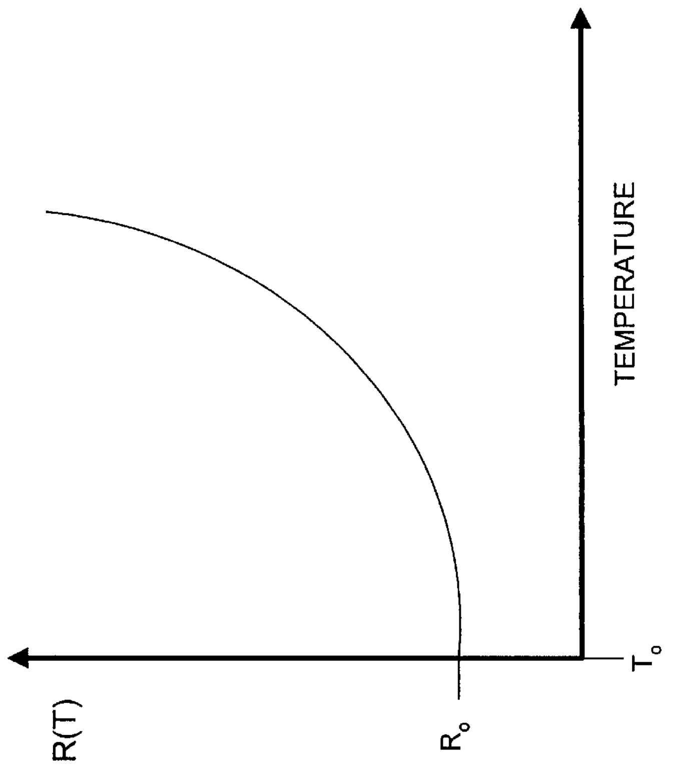
FIG. 2: Resistance vs temperature for typical positive thermal coefficient ("PTC") resistor.

One approach to a solution of this problem according to the present invention is to make use of a resistor, 9, having a positive thermal (or temperature) coefficient ("PTC"). A PTC resistor is typically a semiconductor element whose resistance increases with temperature substantially as depicted in FIG. 2. $R_o$ is the resistance at ambient temperature before substantial heating of the resistor by current flow has occurred. As current passes through resistor 9, causing it to heat, its resistance increases approximately as depicted in FIG. 2. Thus, increased resistance of 9 will cause the potential difference between nozzles 4 and 5 to increase, leading more reliably and predictably to the pulling of the arc to nozzle 5. In the practice of the present invention, a PTC having a cold resistance $R_0$ of approximately 4 ohms is typically used which increases to a very large value as the temperature increases to approximately 80° C., typically in approximately 50 milliseconds.

Figure 3:
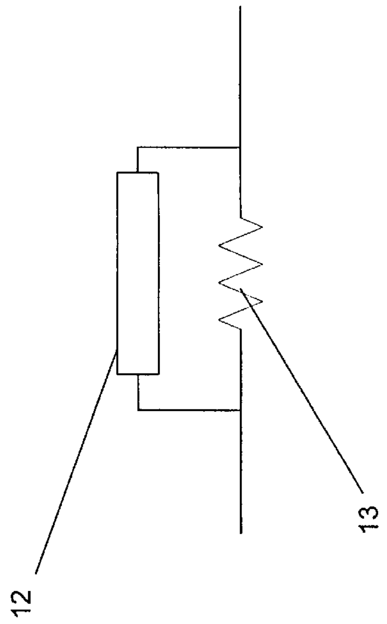
FIG. 3: Parallel configuration of PTC and conventional resistors.

Alternatively, the PTC can be used in parallel with a conventional resistor as depicted in FIG. 3. Parallel resistance depicted in FIG. 3 is advantageous in that neither resistance 12 or 13 need carry the full current delivered to the plasma, thereby reducing the cost of PTC 12 according to the formula for parallel resistance $R_9=[R_{12}(T)R_{13}]/[R_{12}(T)+R_{13}]$. $R_9$, $R_{12}(T)$ and $R_{13}$ denote the resistances of resistor 9, 12 and 13 respectfully as depicted in the figures. The temperature dependence, T, of the PTC $R_{12}$ is made explicit. Currents in plasma generators are typically in the range of approximately 50 amps to approximately 200 amps. Sharing such current among one or more resistors may be preferred to employing a single resistor capable of handling all current.

PTC's typically have significant impedance to the passage of high frequency currents therethrough. Therefore, when igniting the plasma discharge by means of high frequency, it is typically advantageous to use a shunt capacitor for by-passing the high frequency around the PTC, as depicted in the figures. When dc is used for plasma ignition, such shunt capacitors may be omitted.

Figure 6:
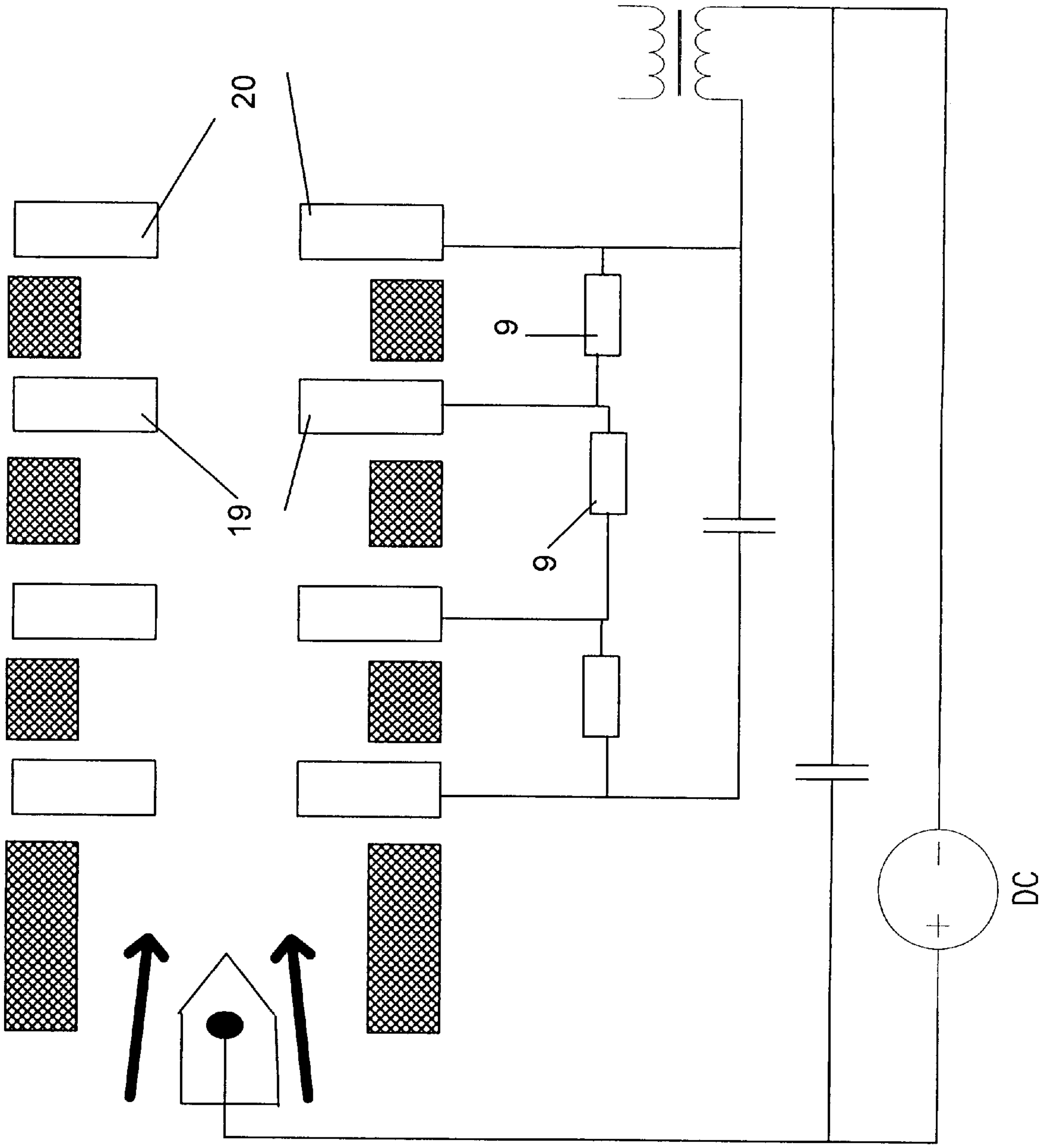
FIG. 6: Schematic depiction of single jet, multiple nozzle plasma generator with high-frequency arc ignition.

The description appearing above relates to the use of PTC resistance to increase the reliability, predictability and control in pulling the arc from nozzle 4 to nozzle 5. However, plasma generators may make use of more than two nozzles in sequence as depicted in FIG. 6. FIG. 6 depicts as an example, and not as a limitation, two additional nozzles, 19 and 20 (separated by insulators), in cross sectional view. Ignition of the plasma causes the current to start flowing from the electrode to the nozzle in closest proximity thereto (nozzle 4 in FIG. 1, for example). The arc then jumps to successively more distant nozzles (5, 19, 20 in FIGS. 1 and 6, for example) until the final nozzle in the sequence is reached. An advantage of using multiple nozzles is that the final nozzle in the sequence may be thoroughly cooled, leading to a very long service life. The circuitry described above for pulling the arc by means of circuitry including a PTC resistor may be applied to more than two nozzles in sequence by repeating the circuitry as many times as necessary to handle every nozzle in the sequence. The example of two additional nozzles (four nozzles total) is depicted in FIG. 6. If dc plasma ignition is used, the shunt capacitors and transformer depicted in FIG. 6 may be omitted.

Figure 4:
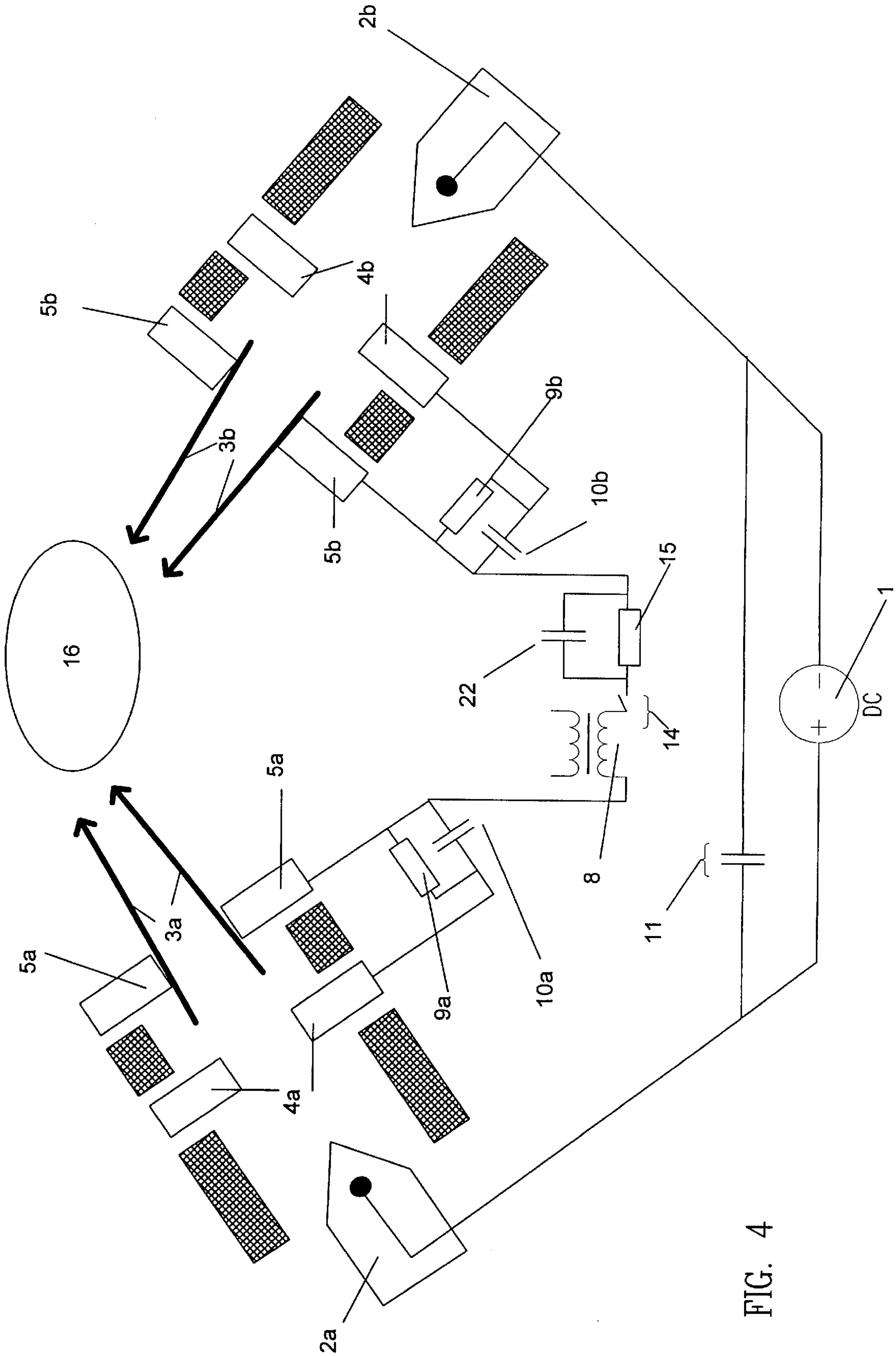
FIG. 4: Schematic depiction of two-jet two nozzle plasma generator with high frequency ignition.

The embodiments of the present invention described above involve a single plasma jet and two or more nozzles. An alternative embodiment of the present invention relates to plasma generators having two plasma jets, as depicted in FIG. 4. Switch 14 is typically closed to begin the plasma ignition sequence. High frequency is applied through coil 8, passes through capacitor 10*a* to reach nozzle 4*a,* where electrical breakthrough between nozzle 4*a* and electrode 2*a* occurs. The high frequency passes through (optional) shunt capacitor 11, capacitor 10*b* to reach nozzle 4*b* and electrode 2*b,* causing breakthrough between electrode 2*b* and nozzle 4*b*. These two sparks (between 2*a*–4*a* and 2*b*–4*b*) are substantially simultaneous. As soon as these electrical breakthroughs (sparks) occur, dc current begins to flow from the + terminal of the dc power supply, 1, through electrode 2*a,* through the plasma to nozzle 4*a,* through resistors 9*a,* 15 and 9*b,* nozzle 4*b,* electrode 2*b* and return to the—terminal of the dc power supply, 1. The (thermally increasing) potential drop across resistors 9*a* and 9*b* causes the arc to switch from nozzles 4*a* and 4*b* to nozzles 5*a* and 5*b* as described above. The present two-jet embodiment is not limited to two nozzles for each jet. Additional nozzles downstream from 5*a* and 5*b* may also be employed in a manner described above in connection with the generation of a single plasma jet.

As in the single jet embodiment, shunt capacitors 11, 10*a,* 10*b,* 22 and transformer, 8 are superfluous if high voltage dc plasma ignition is used.

The two-jet embodiment depicted in FIG. 4 is preferably constructed so the elongate jets of plasma (flares) grow to intersect in a region generally depicted as 16 in FIG. 4. The intersection of the plasma flares 3*a* and 3*b* is a complex interaction of charged gaseous species, the details of which are not critical to the present invention. However, the intersection of plasma flares at region 16 provides a direct pathway for dc current via electrode 2*a,* flare 3*a,* intersection 16, flare 3*b,* and electrode 2*b.* It is preferred that the resistances in the dc circuit, particularly 15, be selected such that the path of lowest resistance is through flare intersection region 16 rather than through nozzle 4*a,* 4*b,* 5*a* or 5*b.* When current flow through region 16 occurs, switch 14 can be opened directing all dc current through intersection region 16. The typical distance from the most downstream nozzle (5*a,* 5*b*) to the intersection of plasma jets in region 16 is approximately 2 cm.

The two-jet plasma generator depicted in FIG. 4 requires the arc to move from nozzle 4*a* to nozzle 5*a* to intersection region 16 in a reproducible, controllable manner (similarly for jet 3*b* and nozzles 4*b,* 5*b*). An approach to the solution of these control problems pursuant to the present invention is to use PTC resistors for 9*a,* 9*b* and 15. In practice, resistors 9*a* and 9*b* typically carry currents of approximately 10 amps. PTC resistors are readily available having the capability to handle such currents. However, resistor 15 may need to handle currents as large as approximately 30 amps. Single PTC resistors capable of handling such large currents are difficult to find at commercially acceptable prices. Thus, it is more convenient to use a parallel configuration of resistors as depicted in FIG. 3 wherein the PTC resistor 12 need carry only a fraction of the total current. As the PTC resistance increases so as to be very much larger than the resistance of 13, essentially all current will be carried by resistor 13, well within the capabilities of conventional resistors. Resistor 13 need have a sufficiently large resistance such that, when carrying all of the current, the potential drop across 13 (as a component of 15) directs essentially all current through intersection region 16. Thus, appropriate selection of resistances for 12 and 13 can provide proper arc control even in the presence of large currents.

Figure 5:
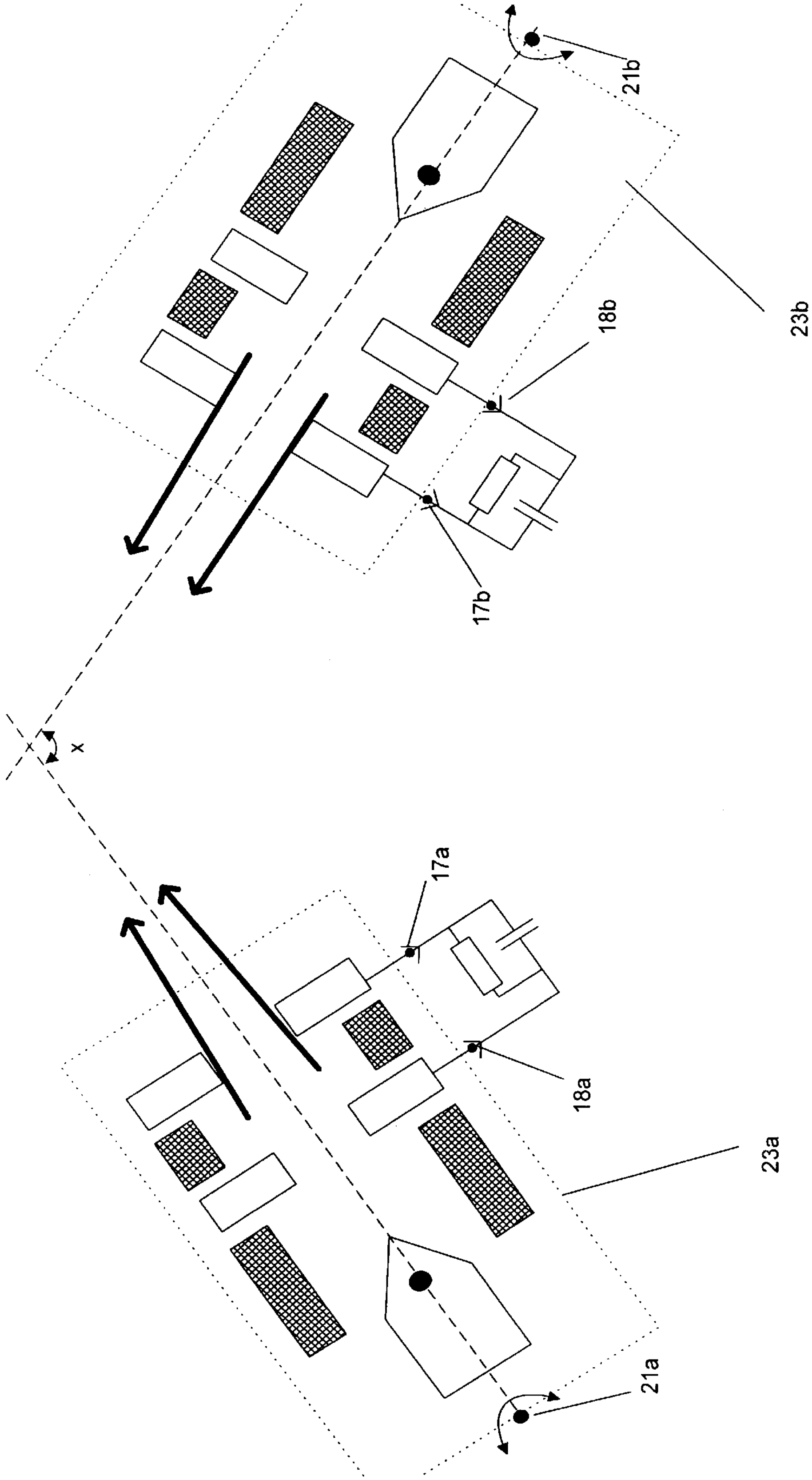
FIG. 5: Schematic depiction of two-jet, two-nozzle plasma generator with adjustable geometry and mechanically detachable contacts.

Another embodiment of the two-jet plasma generator in FIG. 4 is depicted in FIG. 5. In operation of the two jet plasma generator, it is useful to open switch 14 once the arc is directing essentially all current flow through intersection region 16. This opening of switch 14 reduces the probability that an arc can switch back to a nozzle or that some portion of the current flow can branch back to another current path. In addition, mechanically detachable contacts can be interposed to isolate the nozzles from the rest of the circuit. This is depicted in FIG. 5 as 17*a,* 17*b,* 18*a,* 18*b.* The two-jet plasma is arranged so the angle between the electrodes (x in FIG. 5) can be varied and such that increasing the angle x causes mechanical contacts 17*a,* 17*b,* 18*a* and 18*b* to open. Typically, x varies between 90° and 170°. Thus, when the electrical arc has reached the intersection region 16, directing all current through region 16, switch 14 and be opened and angle x enlarged (opening the mechanical contacts). These actions remove all nozzles from the circuit, reducing the probability of current flow other than through intersection region 16.

Rotation of the plasma generating systems, 23*a* and 23*b,* around axes 21*a* and 21*b* respectively in FIG. 5 varies the length of the plasma arc as the angle of intersection, x, varies. That is, as x increases due to rotations about 21*a* and 21*b,* the distance traversed by the plasma arcs before intersection decreases. The power dissipated in the plasma is approximately proportional to the length of the plasma arc since power is the product of voltage drop along the arc and the current flowing through the arc. Voltage drop along the arc is the product of electric field and length. Electric field along typical plasma arcs of the present invention will vary somewhat depending on gas composition, pressure etc. However, typical electric values are approximately 1 volt/millimeter, resulting in power being approximately proportional to the length of the arc. Thus, rotation about 21*a* and 21*b* is a method for approximately controlling the power of the arc.

FIG. 5 depicts the two-jet plasma system having two nozzles associated with each plasma jet. It is within the scope of the present invention to have more than two nozzles with the arc sequentially switching from one to the next in the manner described above, analogous to the circuit depicted in FIG. 6.

Figure 7:
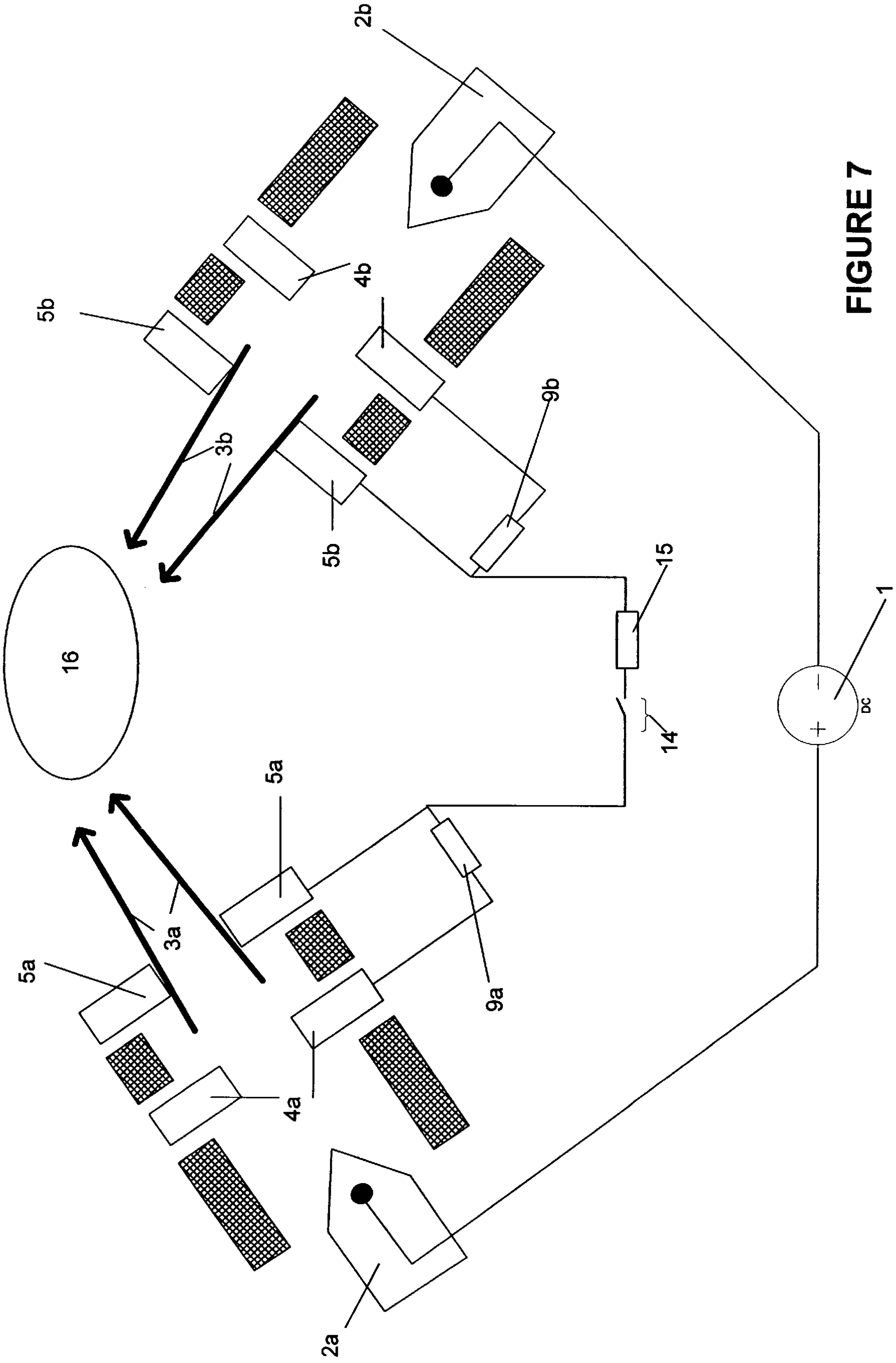
FIG. 7: Schematic depiction of two-jet two nozzle plasma generator with dc pulse ignition.

FIG. 7 depicts the dual plasma jet embodiment of the present invention for the case in which pulsed dc is used to ignite the plasma arcs. Shunting capacitors are omitted. The source of high frequency is also omitted. FIG. 7 depicts the case in which dc power supply itself supplies the dc high voltage pulse. If the power supply lacks this capability, then the dc pulse is supplied by a separate source in parallel with the dc source, 1, in FIG. 7. For simplicity, we depict and describe the typical case in which the same dc source, 1, supplies both ignition pulse as well as operating dc. Modification to a separate source of the plasma-igniting dc pulse is straight forward.

For plasma ignition by means of a dc pulse, switch 14 is closed and the plasma-igniting dc pulse is applied to both electrodes 2*a* and 2*b* with opposite polarities as depicted in FIG. 7. Plasma ignition occurs by the lowest resistance path; that is 1-2*a*-4*a*-4*b*-2*b*-1 in FIG. 7., striking arcs essentially simultaneously between electrode 2*a* and nozzle 4*a* and between electrode 2*b* and nozzle 4*b.* Once struck, the behavior of the dc pulse ignited plasma is essentially the same as the HF ignited plasma depicted in FIG. 4. As PCT resistors 9*a,* 9*b,* 15 heat up, the plasma arcs migrate from nozzle 4*a* (and 4*b*) to nozzle 5*a* (and 5*b*) finally to interaction zone 16. Merging of the arcs in zone 16 permits switch 14 to be opened to suppress spurious current paths from the "a" generator to the "b" generator other than through interaction zone 16.

Having described the invention in detail, those skilled in the art will appreciate that, given the present disclosure, modifications may be made to the invention without departing from the spirit of the inventive concept described herein. Therefore, it is not intended that the scope of the invention be limited to the specific and preferred embodiments illustrated and described. Rather, it is intended that the scope of the invention be determined by the appended claims.

We claim:

1. A dc plasma arc generator comprising:

a) an electrode, a first nozzle and at least one additional nozzle located such that plasma gas flows past said electrode, through said first nozzle and sequentially through said at least one additional nozzle, wherein said electrode, said first nozzle and said at least one additional nozzle are electrically conductive, and wherein said first nozzle and said at least one additional nozzle are sequentially connected electrically by parallel resistance and capacitance, wherein said sequentially connected resistance comprises at least one positive thermal coefficient resistor, the resistance thereof increasing with the passage of current therethrough such that the path of lowest electrical resistance for said arc migrates from said first nozzle sequentially through said at least one additional nozzle to the most downstream of said at least one additional nozzle; and, b) a dc power supply having a first terminal thereof connected to said electrode and a second terminal thereof connected to said most downstream nozzle; and, c) a source of high frequency power having a first high frequency terminal connected to said electrode and a second high frequency terminal connected to said most downstream nozzle, the high frequency power delivered by said high frequency power source being capable of igniting said arc.

2. A plasma arc generator as in claim 1 wherein said high frequency power is approximately 10 megahertz with peak voltage of approximately 6,000 volts.

3. A dc plasma arc generator comprising:

a) an electrode, a first nozzle and at least one additional nozzle located such that plasma gas flows past said electrode, through said first nozzle and sequentially through said at least one additional nozzle, wherein said electrode, said first nozzle and said at least one additional nozzle are electrically conductive, and wherein said first nozzle and said at least one additional nozzle are sequentially connected electrically by resistance, wherein said sequentially connected resistance comprises at least one positive thermal coefficient resistor, the resistance thereof said increasing with the passage of current therethrough such that the path of lowest electrical resistance for said arc migrates from said first nozzle sequentially through said at least one additional nozzle to the most downstream of said at least one additional nozzle; and, b) a dc power supply having a first terminal thereof connected to said electrode and a second terminal thereof connected to said most downstream nozzle; and, c) a source of pulsed high voltage do power having a first high voltage terminal connected to said electrode and a second high voltage terminal connected to said most downstream nozzle, the high voltage dc power delivered by said pulsed high voltage power source being capable of igniting said arc.

4. A plasma arc generator as in claim 3 wherein said pulsed do power is approximately 4,000 volts for approximately 10 milliseconds.

5. A dual jet dc plasma arc generator comprising:

a) a first plasma jet generator comprising a first electrode, a first nozzle and at least one first additional nozzle located such that plasma gas flows past said first electrode, through said first nozzle and sequentially through said at least one first additional nozzle to exit from a first gas exit nozzle, wherein said first electrode, said first nozzle and said at least one first additional nozzle are electrically conductive, and wherein said first nozzle and said at least one first additional nozzle are sequentially connected electrically by first parallel resistance and capacitance; and, b) a second plasma jet generator comprising a second electrode, a second nozzle and at least one second additional nozzle located such that plasma gas flows past said second electrode, through said second nozzle and sequentially through said at least one second additional nozzle to exit from a second gas exit nozzle, wherein said second electrode, said second nozzle and said at least one second additional nozzle are electrically conductive, and wherein said second nozzle and said at least one second additional nozzle are sequentially connected electrically by second parallel resistance and capacitance, wherein said first plasma jet generator and said second plasma jet generator have a location such that said first plasma jet exiting from said first gas exit nozzle and said second plasma jet exiting from said second gas exit nozzle intersect in a plasma interaction zone; and, wherein said first and second parallel resistances comprise at least one positive thermal coefficient resistor, the resistance thereof increasing with the passage of current therethrough such that the paths of lowest resistance for said first and said second plasma jets migrate sequentially through said nozzles to direct current flow from said first electrode to said second electrode through said plasma interaction zone; and, c) a dc power supply having a first terminal thereof connected to said first electrode and a second terminal thereof connected to said second electrode; and, d) a source of high frequency power having a first high frequency terminal connected to said first gas exit nozzle and a second high frequency terminal connected to said second gas nozzle, the high frequency power delivered by said high frequency power source being capable of igniting said arc.

6. A dual jet dc plasma arc generator comprising:

a) a first plasma jet generator comprising a first electrode, a first nozzle and at least one first additional nozzle located such that plasma gas flows past said first electrode, through said first nozzle and sequentially through said at least one first additional nozzle to exit from a first gas exit nozzle, wherein said first electrode, said first nozzle and said at least one first additional nozzle are electrically conductive, and wherein said first nozzle and said at least one first additional nozzle are sequentially connected electrically by first resistance; and, b) a second plasma jet generator comprising a second electrode, a second nozzle and at least one second additional nozzle located such that plasma gas flows past said second electrode, through said second nozzle and sequentially through said at least one second additional nozzle to exit from a second gas exit nozzle, wherein said second electrode, said second nozzle and said at least one second additional nozzle are electrically conductive, and wherein said second nozzle and said at least one second additional nozzle are sequentially connected electrically by second resistance; and, wherein said first plasma jet generator and said second plasma jet generator have a location such that said first plasma jet exiting from said first gas exit nozzle and said second plasma jet exiting from said second gas exit nozzle intersect in a plasma interaction zone; and, wherein said first and second resistances comprise at least one positive thermal coefficient resistor, the resistance thereof increasing with the passage of current therethrough such that the paths of lowest resistance for said first and said second plasma jets migrate sequentially through said nozzles to direct current flow from said first electrode to said second electrode through said plasma interaction zone; and, c) a dc power supply having a first terminal thereof connected to said first electrode and a second terminal thereof connected to said second electrode; and, d) a source of pulsed high voltage dc power having a first high voltage terminal connected to said first electrode and a second high frequency terminal connected to said second electrode, the high voltage power delivered by said high voltage dc power source being capable of igniting said arc; and, e) an electrical path for conducting dc between said first gas exit nozzle and said second gas exit nozzle.

7. A plasma arc generator as in claim 5 or 6 wherein said first plasma jet generator and said second plasma jet generator are separately rotatable about separate axes of rotation, altering thereby the distance from said first electrode and said second electrode to said plasma interaction zone.

8. A plasma arc generator as in claim 7 further comprising at least one switch wherein said switch causes electrical disconnection of the nozzles of said first or said second plasma jet generator upon rotation of said generator about said axis of rotation.

9. A plasma arc generator as in claim 7 wherein said rotation of said first and said second plasma jet generators causes the angle of plasma intersection to vary from approximately 90 degrees to approximately 170 degrees.

10. A plasma arc generator as in claim 5 or 6 wherein the distance from said exit nozzles and to said plasma interaction zone is approximately 2 centimeters.

11. A plasma arc generator as in claim 1, 3, 5 or 6 wherein the distance from said electrode to the closest nozzle thereto is approximately 1.5 millimeters.

12. A plasma arc generator as in claim 1, 3, 5 or 6 wherein said positive thermal coefficient resistors have a resistance of approximately 4 ohms at room temperature.

* * * * *

UNITED STATES PATENT AND TRADEMARK OFFICE

CERTIFICATE OF CORRECTION

PATENT NO. : 6,121,571
DATED : September 19, 2000
INVENTOR(S) : Siniaguine et al.

It is certified that error appears in the above-identified patent and that said Letters Patent is hereby corrected as shown below:

Title page,
Please insert -- [73] Assignee: TruSi Technologies, LLC, Sunnyvale, CA (US). --

Signed and Sealed this

Fourth Day of February, 2003

JAMES E. ROGAN
*Director of the United States Patent and Trademark Office*